United States Patent
Igarashi et al.

(10) Patent No.: US 9,169,870 B2
(45) Date of Patent: Oct. 27, 2015

(54) GEAR SYSTEM AND IMAGE FORMING APPARATUS

(75) Inventors: Hiroshi Igarashi, Aichi (JP); Tomitake Aratachi, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 841 days.

(21) Appl. No.: 13/021,189

(22) Filed: Feb. 4, 2011

(65) Prior Publication Data

US 2011/0206438 A1   Aug. 25, 2011

(30) Foreign Application Priority Data

Feb. 25, 2010   (JP) ................. 2010-040497

(51) Int. Cl.
| B41J 13/00 | (2006.01) |
|---|---|
| B41J 15/00 | (2006.01) |
| F16C 33/10 | (2006.01) |
| F16C 17/02 | (2006.01) |
| F16H 1/20 | (2006.01) |
| F16H 57/04 | (2010.01) |

(52) U.S. Cl.
CPC ............. F16C 33/107 (2013.01); F16C 17/026 (2013.01); F16H 1/20 (2013.01); F16H 57/0428 (2013.01); F16H 57/0471 (2013.01); F16H 57/0495 (2013.01); Y10T 74/19651 (2015.01)

(58) Field of Classification Search
CPC ............. F16C 33/107; F16C 17/026; Y10T 74/19651; F16H 1/20; F16H 57/0428; F16H 57/0471; F16H 57/0495
USPC ............................. 400/578; 74/414
See application file for complete search history.

(56) References Cited

U.S. PATENT DOCUMENTS

| 5,129,739 A | 7/1992 | Asai et al. |
|---|---|---|
| 7,234,871 B2 * | 6/2007 | Maruyama et al. ........... 384/292 |
| 2002/0112319 A1 | 8/2002 | Kida |

FOREIGN PATENT DOCUMENTS

| JP | 64-039966 | 3/1989 |
|---|---|---|
| JP | 64-39966 | 3/1989 |
| JP | 4019421 A | 1/1992 |
| JP | 5-92629 U | 12/1993 |
| JP | 7160095 A | 6/1995 |

(Continued)

OTHER PUBLICATIONS

Notice of Allowance issued in corresponding Japanese Application No. 2010-040497, dated Oct. 2, 2012.

(Continued)

*Primary Examiner* — Blake A Tankersley
*Assistant Examiner* — Marissa Ferguson Samreth
(74) *Attorney, Agent, or Firm* — Banner & Witcoff, Ltd.

(57) ABSTRACT

A gear system is provided. The gear system includes a driven gear, which is rotated by driving force from a driving gear, a base member to support the driven gear, and a bearing structure, including a shaft and a shaft hole to rotatably support the shaft, by which the driven gear is rotatably attached to the base member. One of the shaft and the shaft hole is provided to the driven gear, and the other of the shaft and the shaft hole is provided to the base member. The bearing structure has a lubricant reservoir in a slidable section, in which the shaft and the shaft hole are slidably in contact with each other when the driven gear is rotated by the driving force from the driving gear, the lubricant reservoir containing lubricant to lubricate the slidable section.

12 Claims, 14 Drawing Sheets

(56) References Cited

FOREIGN PATENT DOCUMENTS

| JP | 09-280322 | 10/1997 |
| JP | 11-126453 | 5/1999 |
| JP | 11-223993 A | 8/1999 |
| JP | 2000205378 A | 7/2000 |
| JP | 2002-323034 | 11/2002 |
| JP | 2005-216442 | 8/2005 |
| JP | 2006-350008 A | 12/2006 |

OTHER PUBLICATIONS

Notification of Reasons for Rejection for Japanese patent application No. 2010-040497 mailed Jan. 31, 2012.

* cited by examiner

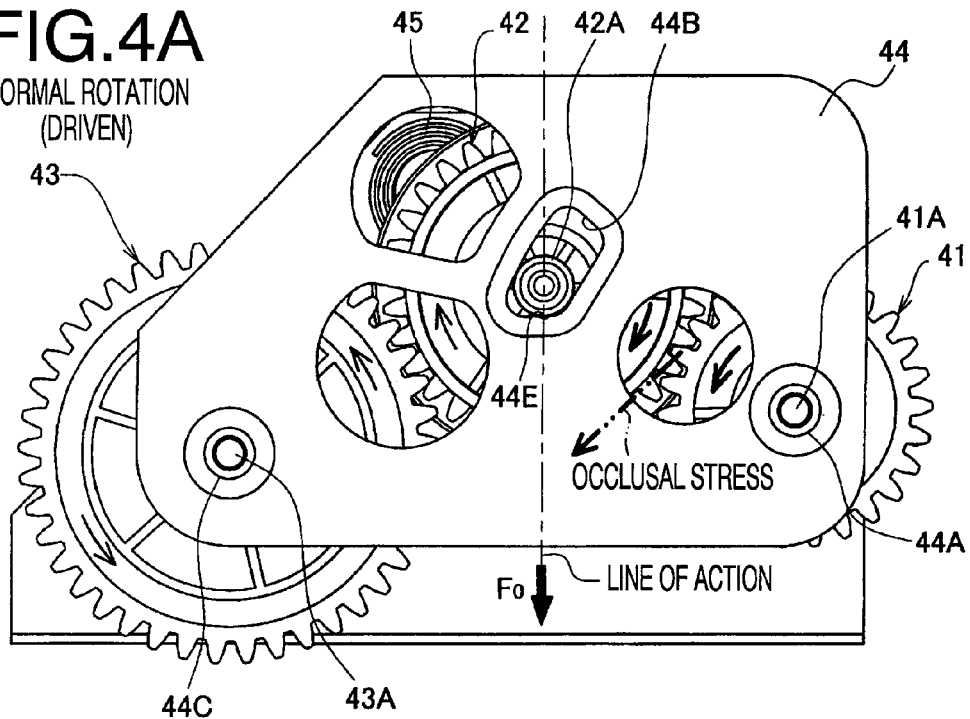
FIG.4A NORMAL ROTATION (DRIVEN)
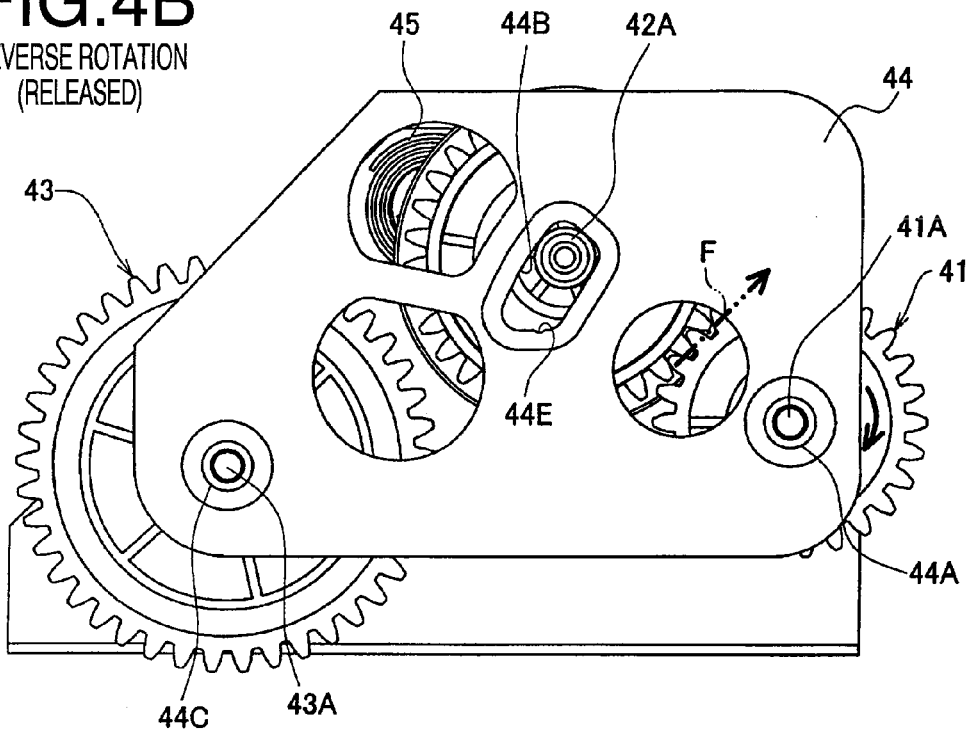
FIG.4B REVERSE ROTATION (RELEASED)

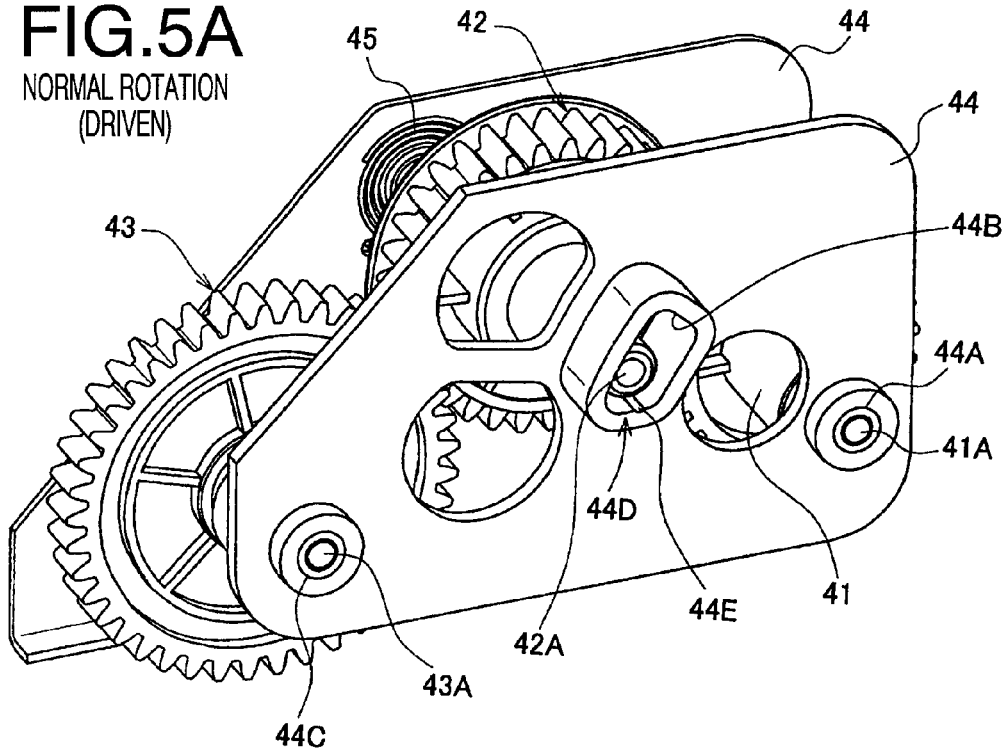
FIG.5A NORMAL ROTATION (DRIVEN)
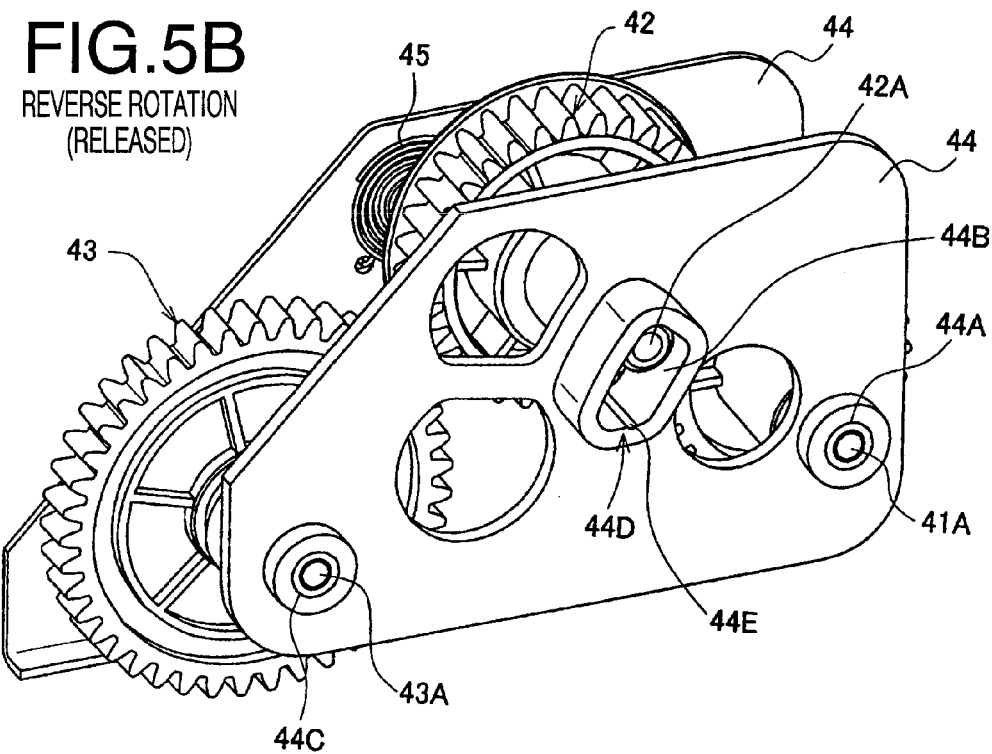
FIG.5B REVERSE ROTATION (RELEASED)

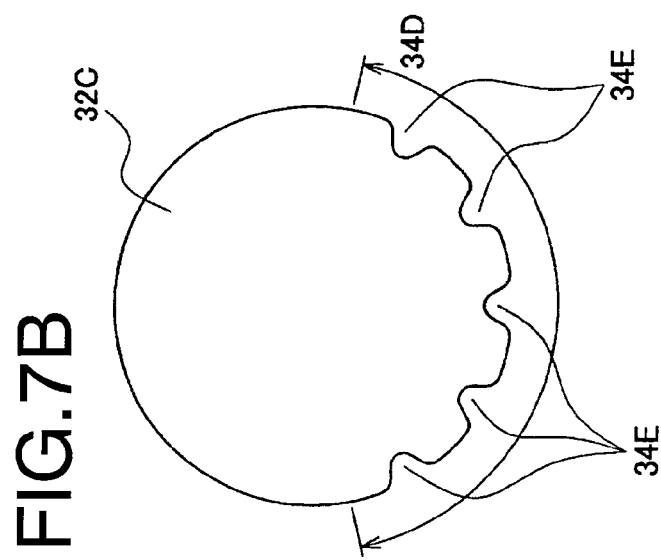
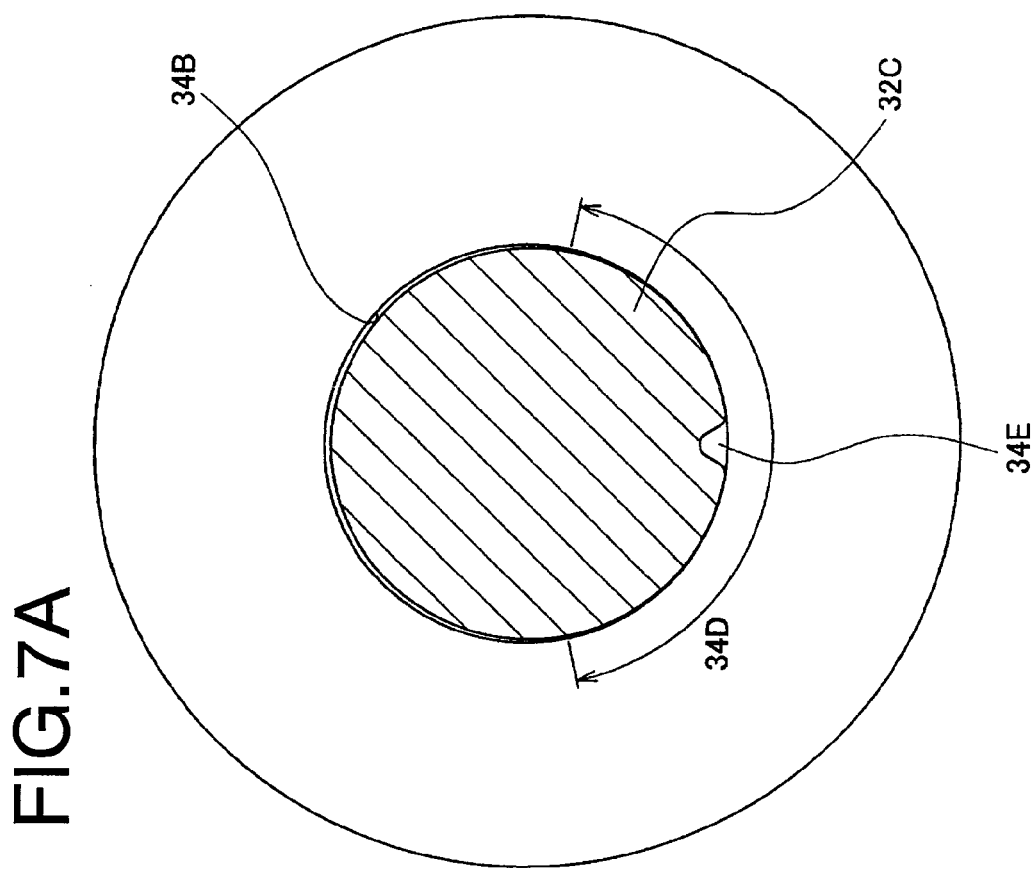

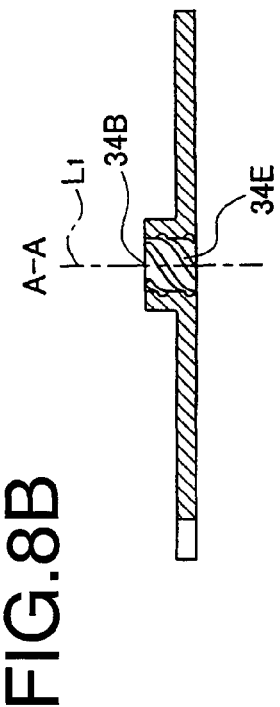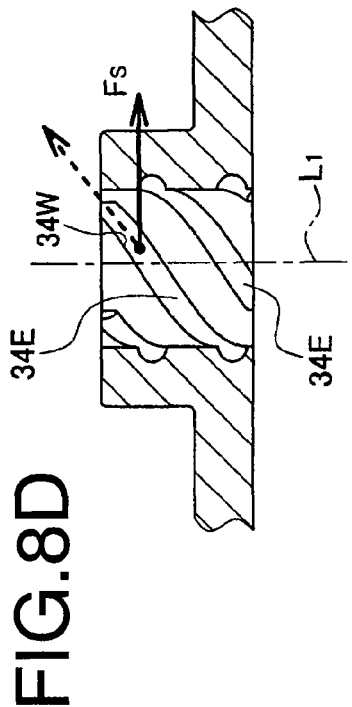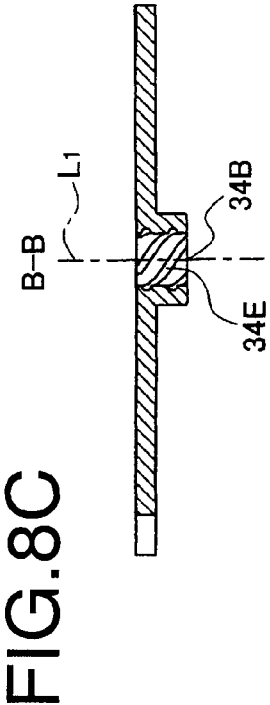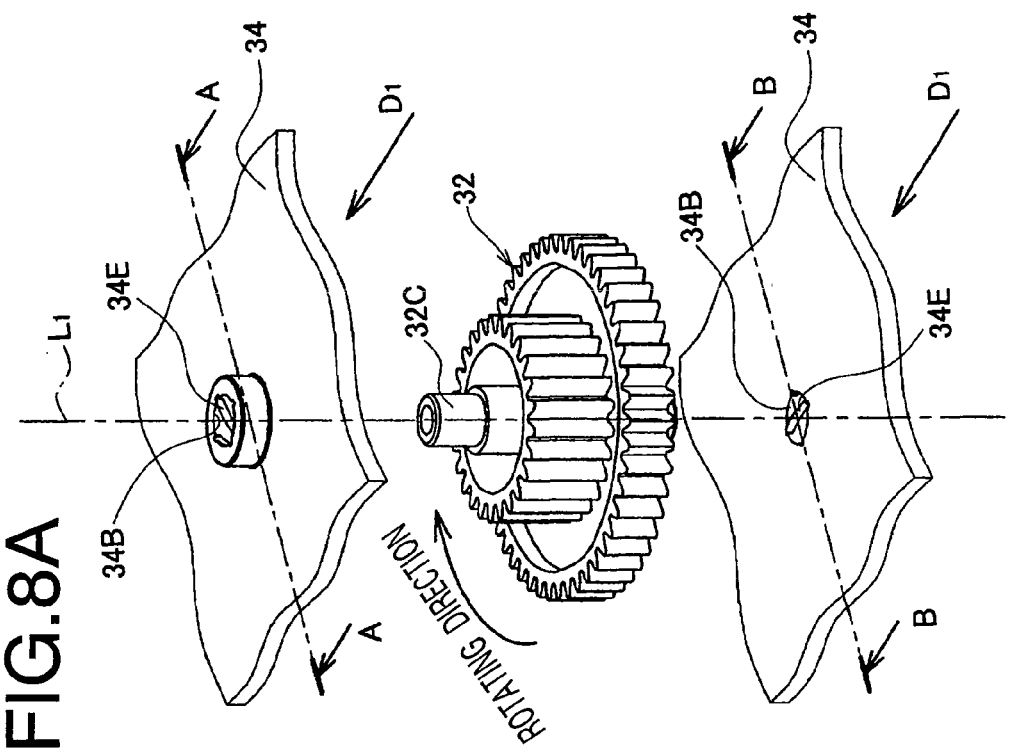
FIG.8B
FIG.8D
FIG.8C
FIG.8A

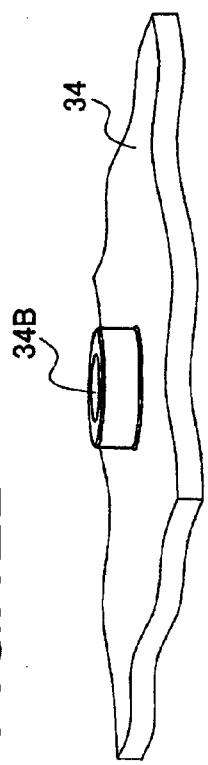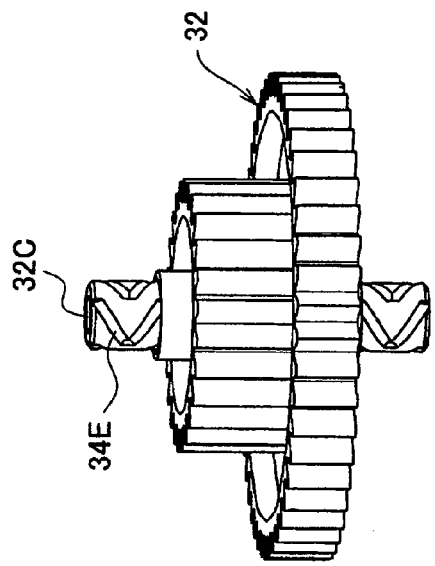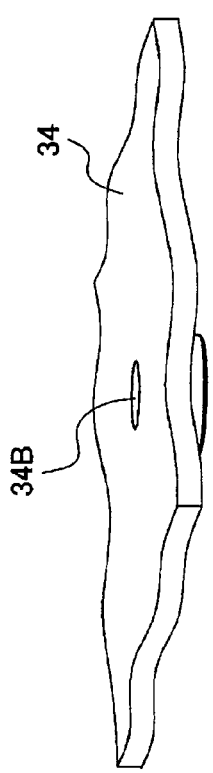
FIG.12A
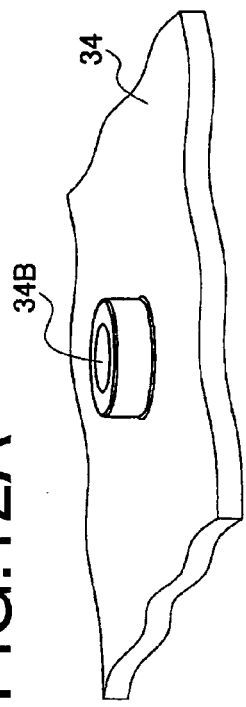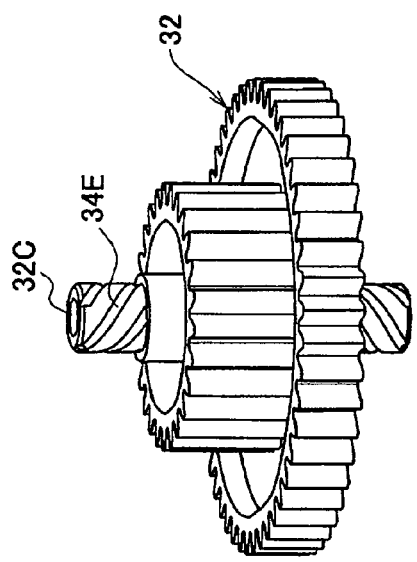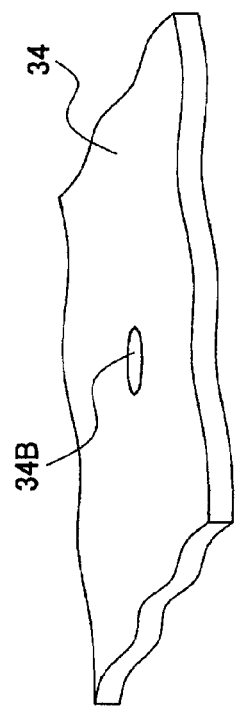
FIG.12B

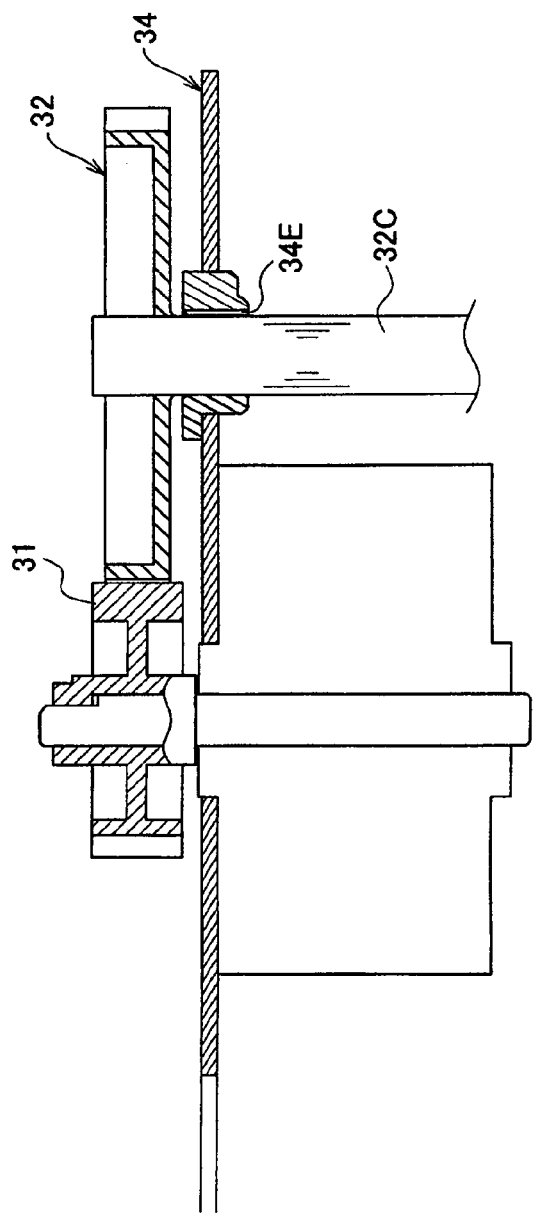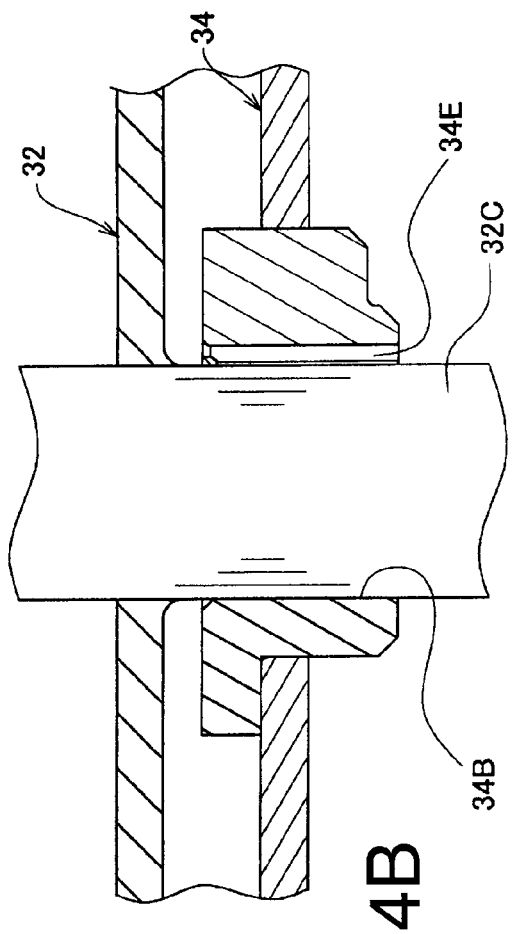
FIG.14A
FIG.14B

GEAR SYSTEM AND IMAGE FORMING APPARATUS

CROSS REFERENCE TO RELATED APPLICATION

This application claims priority from Japanese Patent Application No. 2010-040497, filed on Feb. 25, 2010, the entire subject matter of the which is incorporated herein by reference.

BACKGROUND

1. Technical Field

An aspect of the present invention relates to a gear system, having driven gears and supporting parts to support the driven gears, and an image forming apparatus having the gear system.

2. Related Art

A plain bearing, which holds a rotatable shaft in a bush and has no rotor is known. In order to have the shaft to slidably rotate in the bush, the plain bearing may be configured to have a lubricant reservoir, in which lubricant for the shaft is filled, in a position between the shaft and the bush so that lubricity between the shaft and the bush is improved.

SUMMARY

The plain bearing may be configured to support a gear. That is, the gear may be attached to a sleeve, which serves as the bush, and the shaft may be installed in the sleeve so that the gear attached to the sleeve is rotatable along with the sleeve with respect to the shaft. In this configuration, the gear may also be formed to have the lubricant reservoir. Further, a gear train, having a plurality of cooperatively-working driven gears, may include such a gear with the lubricant reservoir. However, in terms of lubricity, it has not been suggested in which position in the driven gear the lubricant reservoir should be arranged.

In consideration of the above, the present invention is advantageous in that a gear system having a driving gear and a driven gear, in which a shaft is lubricative with respect to the bearing within the driven gear, is provided. Further, an image forming apparatus employing the gear system is provided.

According to an aspect of the present invention, a gear system is provided. The gear system includes a driven gear, which is rotated by driving force from a driving gear, a base member to support the driven gear, and a bearing structure, including a shaft and a shaft hole to rotatably support the shaft, by which the driven gear is rotatably attached to the base member. One of the shaft and the shaft hole is provided to the driven gear, and the other of the shaft and the shaft hole is provided to the base member. The bearing structure has a lubricant reservoir in a slidable section, in which the shaft and the shaft hole are slidably in contact with each other when the driven gear is rotated by the driving force from the driving gear, the lubricant reservoir containing lubricant to lubricate the slidable section.

According to another aspect of the present invention, a gear system is provided. The gear system includes a driven gear, which is rotated by driving force from a driving gear, a base member to support the driven gear, and a bearing structure, including a shaft and a shaft hole to rotatably support the shaft, by which the driven gear is rotatably attached to the base member. At least one of an outer circumference of the shaft and an inner circumference of the shaft hole is formed to have a lubricant reservoir, which contains lubricant to lubricate a slidable section in the outer circumference of the shaft and the inner circumference of the shaft hole. The lubricant reservoir is formed in an inclined orientation with respect to an axial line of at least one of the shaft and the shaft hole when the lubricant reservoir is viewed along a viewing direction, the viewing direction being perpendicular to the axial line of the at least one of the shaft and the shaft hole and to face with the axial line.

According to still another aspect of the present invention, an image forming apparatus is provided. The image forming apparatus includes an image forming unit to form an image on a sheet, rollers to move the sheet in the image forming apparatus, and a gear system to transmit driving force to the rollers. The gear system includes a driven gear, which is rotated by the driving force transmitted from a driving gear, a base member to support the driven gear, and a bearing structure, including a shaft and a shaft hole to rotatably support the shaft, by which the driven gear is rotatably attached to the base member. One of the shaft and the shaft hole is provided to the driven gear, and the other of the shaft and the shaft hole is provided to the base member. The bearing structure has a lubricant reservoir in a slidable section, in which the shaft and the shaft hole are slidably in contact with each other when the driven gear is rotated by the driving force from the driving gear, the lubricant reservoir containing lubricant to lubricate the slidable section.

BRIEF DESCRIPTION OF THE ACCOMPANYING DRAWINGS

FIG. 4A is a side view of a second gear system 40 in normal rotation according to the first embodiment of the present invention. FIG. 4B is a side view of the second gear system 40 in reverse rotation according to the first embodiment of the present invention.

FIG. 5A is a perspective view of the second gear system 40 in normal rotation according to the first embodiment of the present invention. FIG. 5B is a perspective view of the second gear system 40 in reverse rotation according to the first embodiment of the present invention.

FIGS. 7A and 7B are enlarged views of the slidable section 34D in the shaft hole 34B and the shaft 32C with the groove(s) 34E according to a third embodiment of the present invention.

FIG. 8A is an exploded and partial view of the first gear system 30 according to a fourth embodiment of the present invention. FIG. 8B is a cross-sectional view of the first gear system 30 according to the fourth embodiment of the present invention taken from a line A-A in FIG. 8A. FIG. 8C is a cross-sectional view of the first gear system 30 according to the fourth embodiment of the present invention taken from a line B-B in FIG. 8A. FIG. 8D is a cross-sectional view of the shaft hole 34B viewed along a viewing direction according to the fourth embodiment of the present invention.

Figure 9A:
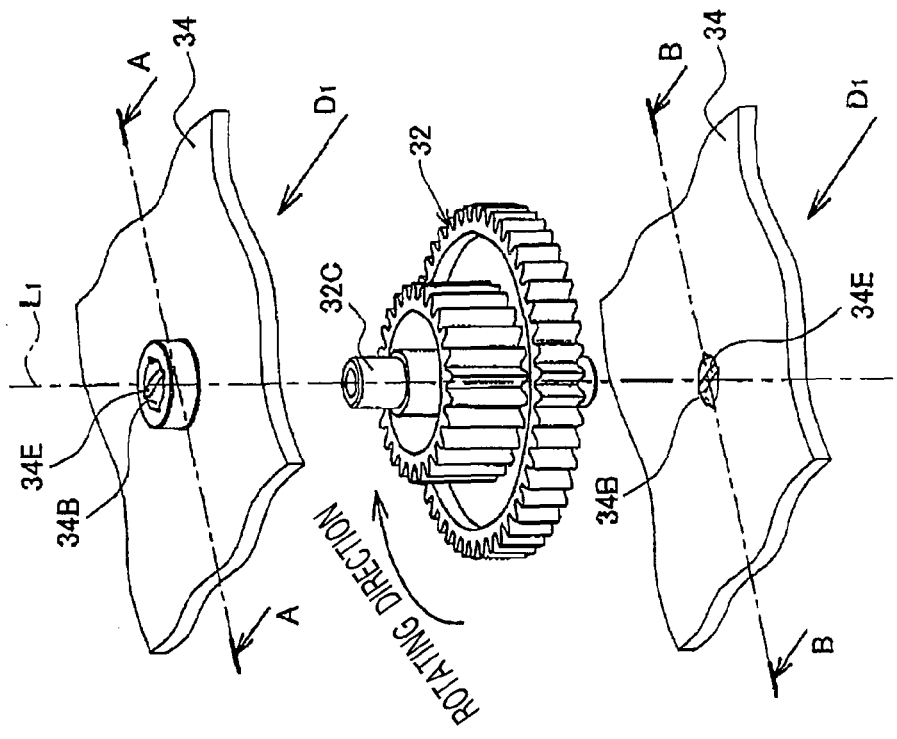
Figure 9B:
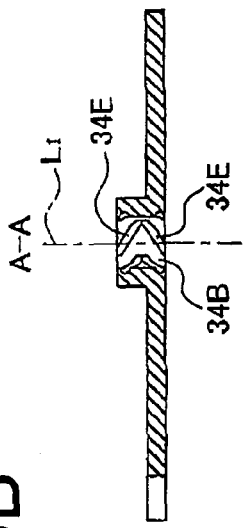
Figure 9D:
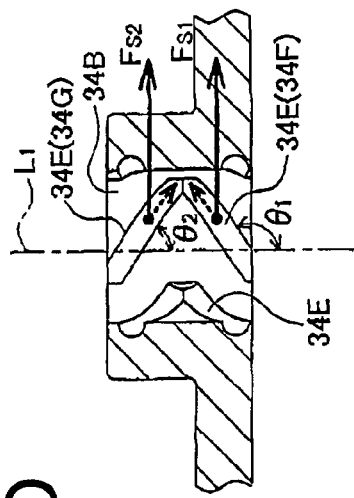
Figure 9C:
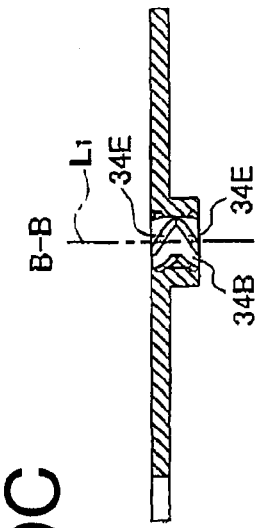

FIG. 9A is an exploded and partial view of the first gear system 30 according to a fifth embodiment of the present invention. FIG. 9B is a cross-sectional view of the first gear system 30 according to the fifth embodiment of the present invention taken from a line A-A in FIG. 9A. FIG. 9C is a cross-sectional view of the first gear system 30 according to the fifth embodiment of the present invention taken from a line B-B in FIG. 9A. FIG. 9D is a cross-sectional view of the shaft hole 34B viewed along the viewing direction according to the fifth embodiment of the present invention.

Figure 10:
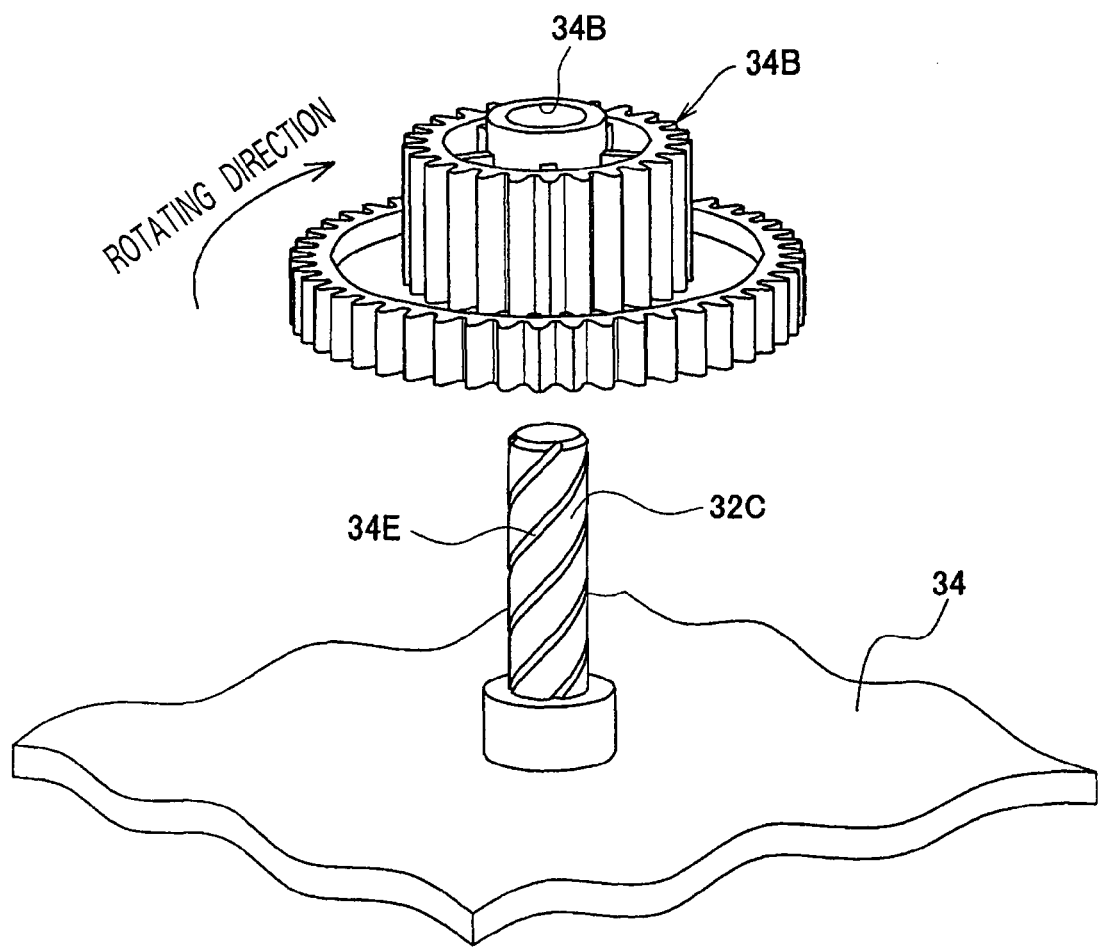

FIG. 10 is an exploded and partial view of the first gear system 30 according to a sixth embodiment of the present invention.

Figure 11:
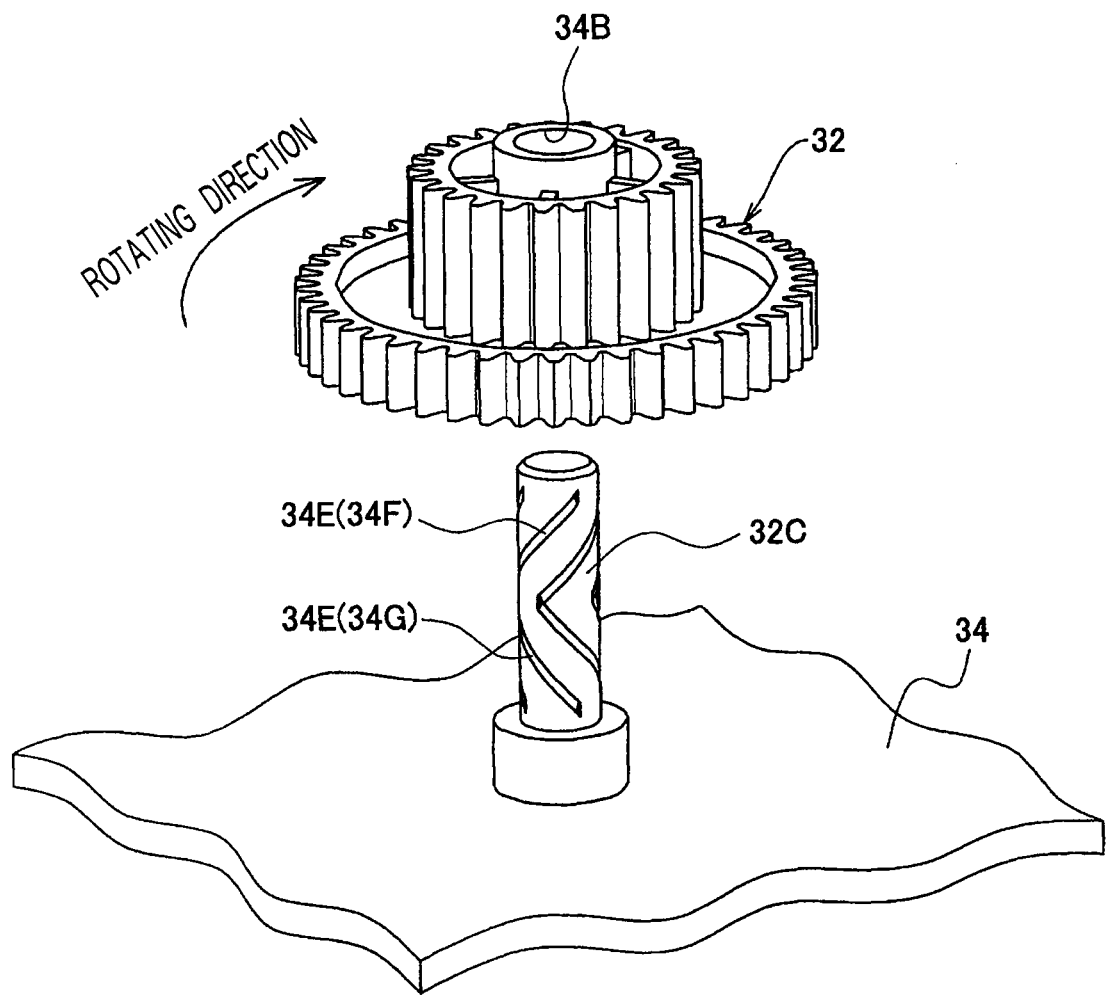

FIG. 11 is an exploded and partial view of the first gear system 30 according to a seventh embodiment of the present invention.

FIGS. 12A and 12B are exploded and partial views of the first gear system 30 according to an eighth embodiment of the present invention.

Figure 13A:
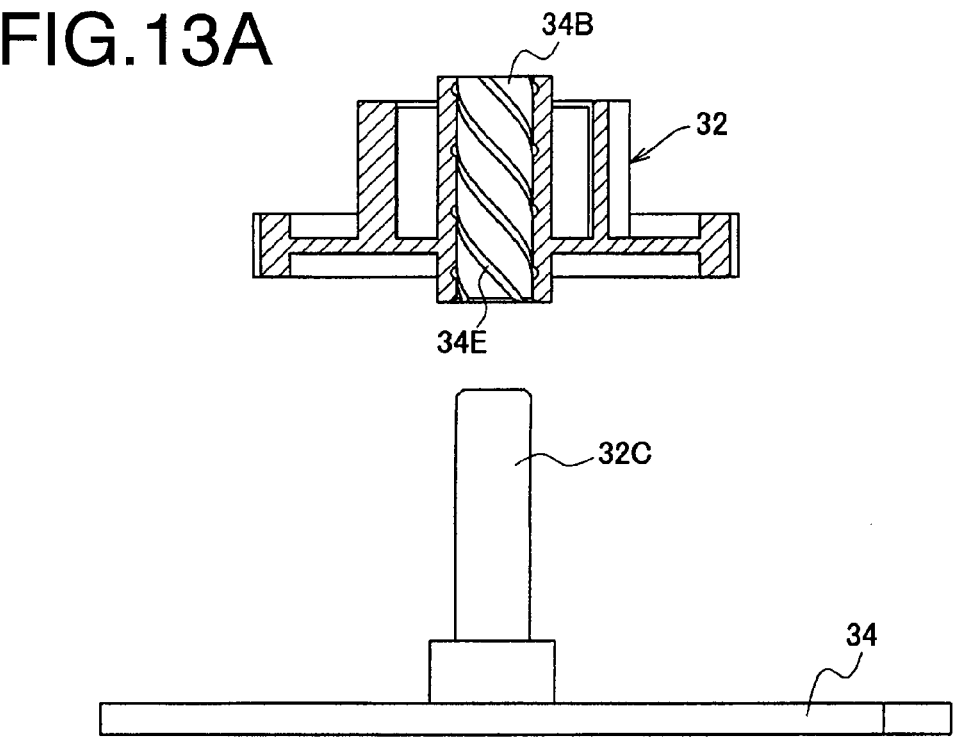
Figure 13B:
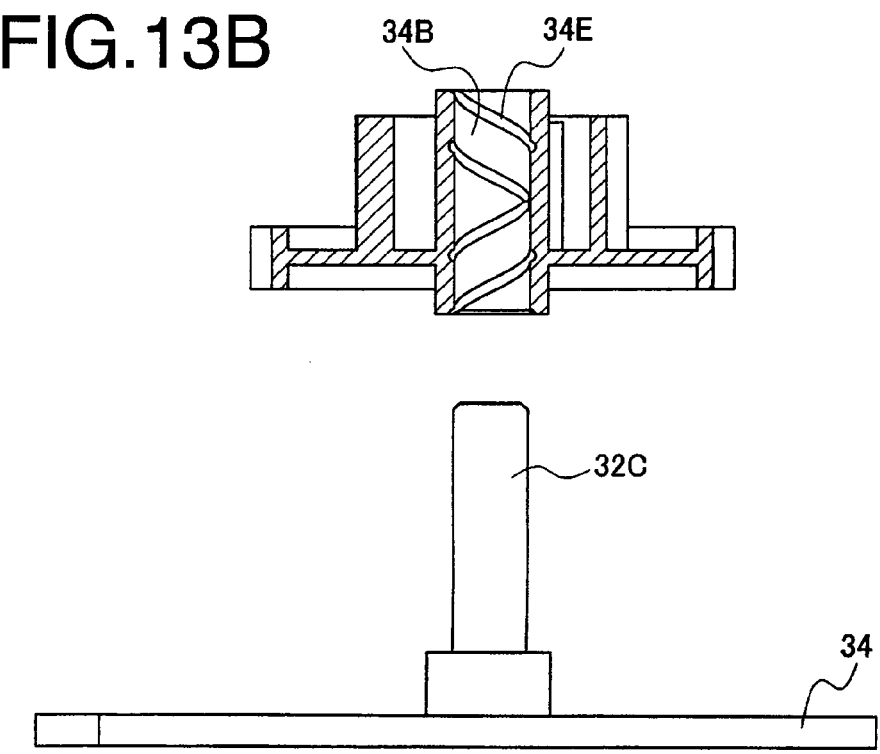

FIGS. 13A and 13B are exploded cross-sectional partial views of the first gear system 30 according to the eighth embodiment of the present invention.

FIG. 14A is a cross-sectional partial view of the first gear system 30 according to a ninth embodiment of the present invention. FIG. 14B is an enlarged cross-sectional partial view of the shaft hole 34B according to the ninth embodiment of the present invention.

DETAILED DESCRIPTION

Hereinafter, embodiments according to aspects of the present invention will be described with reference to the accompanying drawings.

[First Embodiment]

1. Overall Configuration of an Image Forming Apparatus

Figure 1:
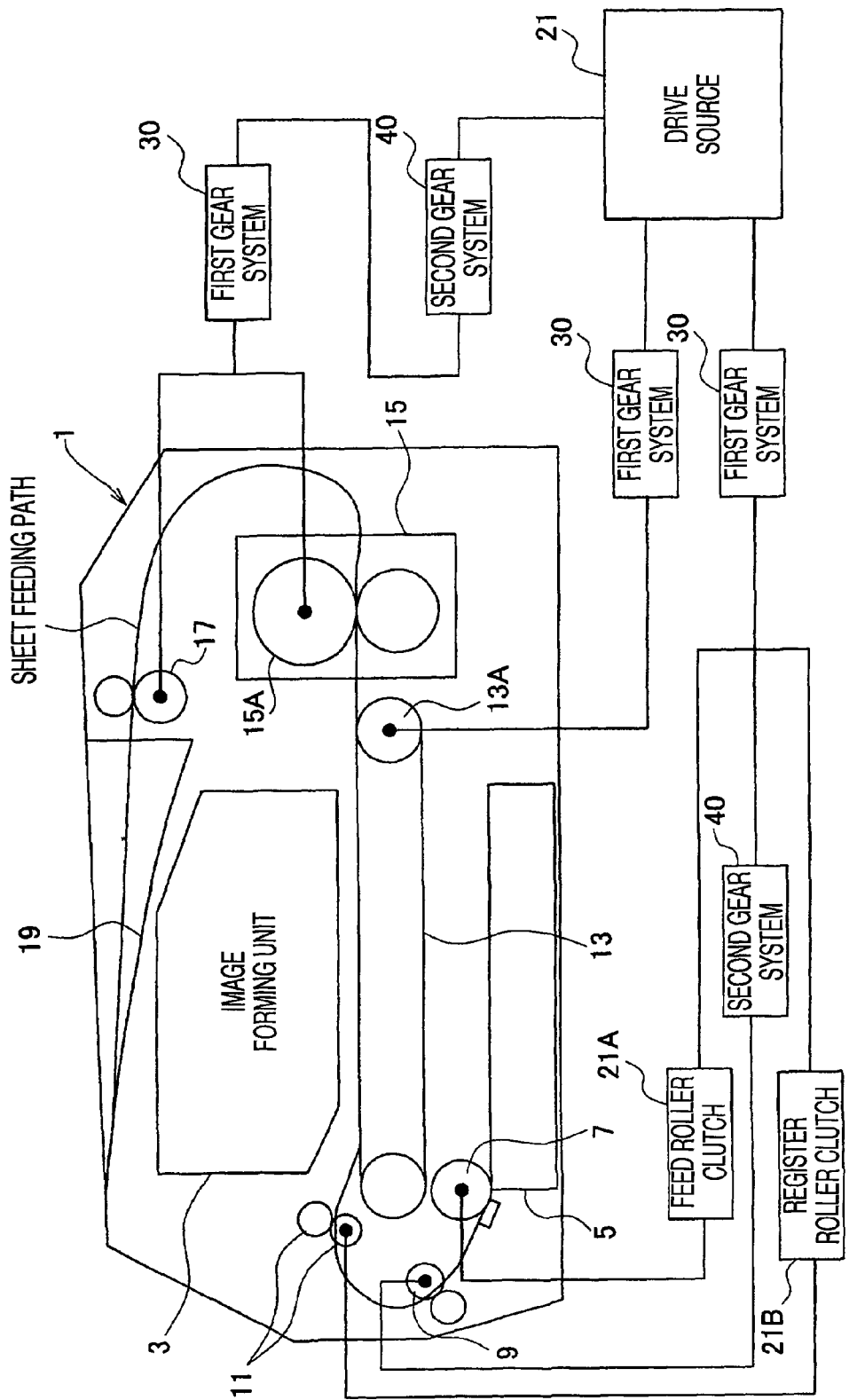
FIG. 1 is an illustrative diagram of an image forming apparatus having gear systems according to an embodiment of the present invention.

An image forming apparatus 1 (see FIG. 1) according to the first embodiment of the present invention is an electrophotographic printer having an image forming unit 3, which transfers developer agent onto a recording sheet (e.g., paper, an OHP sheet, etc.). The image forming unit 3 includes a photosensitive drum (not shown) to carry the developer agent and an exposure (not shown) to emit a beam form a latent image on a surface of the photosensitive drum.

The image forming apparatus 1 includes a sheet tray 5, in which unused recording sheets are stored. The recording sheets in the sheet tray 5 are forwarded to the image forming unit 3 by sheet-conveying rollers such as a feed roller 7 and a conveyer roller 9 and straightened an orientation thereof by a pair of register rollers 11 to be carried to a conveyer belt 13.

The image forming apparatus 1 includes a fixing unit 15, in which the image transferred onto the recording sheet is thermally fixed thereat. The recording sheet with the fixed image is discharged out of the image forming unit 3 by a discharge roller 17 to be settled in a discharge tray 19.

The image forming apparatus 1 is provided with a plurality of rollers to convey the recording sheet, such as a driving roller 13A to drive the conveyer belt 13, a heat roller 15A in the fixing unit 15, the feed roller 7, the conveyer roller 9, and the register rollers 11. The rollers are driven by driving force generated in a drive source 21 and transmitted via at least one of first gear systems 30 and second gear systems 40.

The first gear systems 30 and the second gear systems 40 are driving force transmission systems, each of which includes a train of gears. The driving force from the drive source 21 is transmitted through the first gear system 30 or the second gear system 40 in a reduced speed to the rollers. In particular, the second gear system 40 is designed to disengage the gears in the gear train when reverse rotating force, which may rotate the gears in an opposite direction from rotation caused by the driving force from the drive force 21, is transmitted to the second gear system 40 so that the reverse rotating force is absorbed in the second gear system 40. Behaviors of the first gear system 30 and the second gear system 40 will be described later in detail.

In transmission paths of the driving force from the drive source 21 to the feed roller 7 and to the register rollers 11, clutches 21A, 21B to shutoff the driving force from the drive source 21 are provided. Activation of the drive source 21, clutches 21A, 21B is controlled by a controller (not shown) such as a microcomputer.

2. Gear Systems 2.1 First Gear System

Figure 2A:
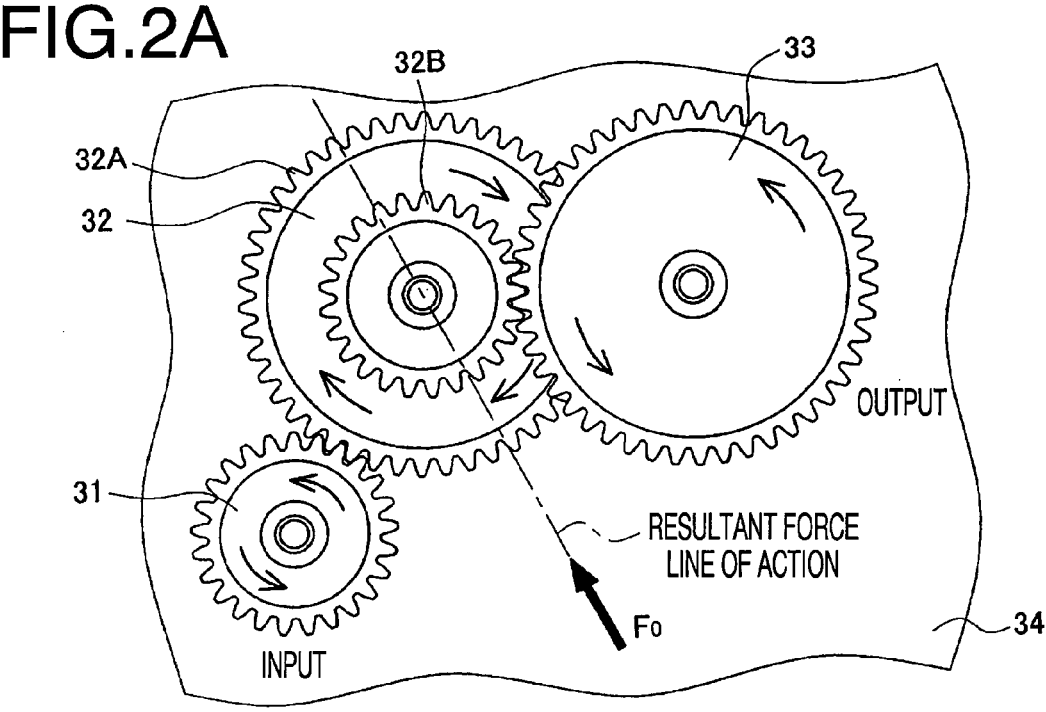
FIG. 2A is a plane view of a first gear system 30 according to a first embodiment of the present invention.

As shown in FIG. 2A, the first gear system 30 includes a driving gear 31, a driven gear 32, an output gear 33, and a pair of base plates 34. The driving gear 31 is rotated by the driving force from the drive source 21. The driven gear 32 is rotated according to the rotation of the driving gear 31. The output gear 33 is rotated according to the rotation of the driven gear 32 and outputs the rotating force to the rollers. The base plates 34 hold the driving gear 31, the driven gear 32, and the output gear 33.

Although the first gear system 30 includes additional gears (not shown) to transmit the driving force from the drive source 21 to the driving gear 31 and from the output gear 33 to the rollers, description of those additional gears is omitted.

In the present embodiment, the driven gear 32 is a reduction gear having an integrally-formed greater diameter gear 32A and a smaller diameter gear 32B. The driving gear 31 is engaged with the greater diameter gear 32A, and the output gear 33 is engaged with the smaller diameter gear 32B. Accordingly, velocity of the driving force from the drive source 21 is reduced in the first gear system 30.

Figure 2B:
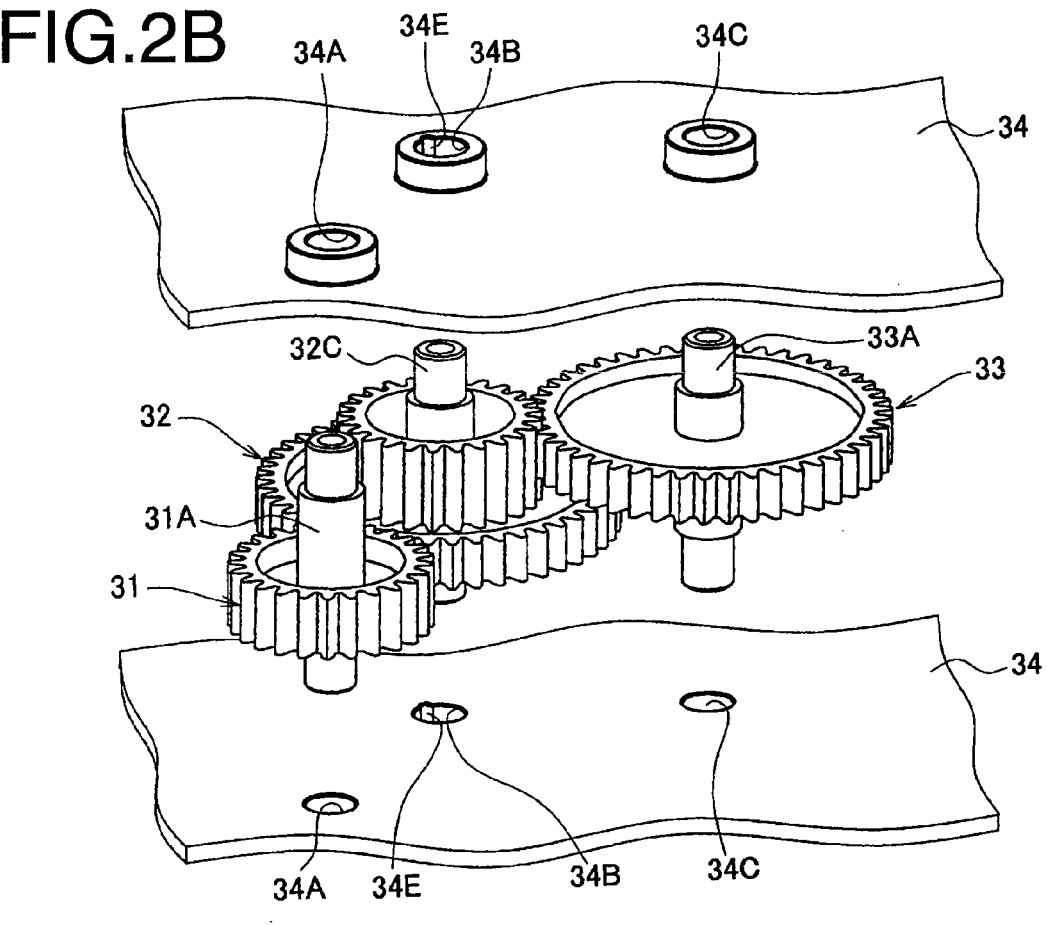
FIG. 2B is an exploded perspective view of the first gear system 30 according to the first embodiment of the present invention.

Each of the driving gear 31, the driven gear 32, and the output gear 33 has a bearing structure. More specifically, the driving gear 31, the driven gear 32, and the output gear 33 have integrally-formed shafts 31A, 32C, and 33A (see FIG. 2B) respectively, and the base plates 34 are formed to have shaft holes 34A, 34B, and 34C, in which the shafts 31A, 32C, 33A are slidably supported. Thus, the driving gear 31, the driven gear 32, and the output gear 33 are rotatably supported by the pair of base plates 34 from axial sides. The shaft holes 34A, 34B, and 34C are formed to have cross-sections of circles.

In other words, the base plates 34 hold the driving gear 31, the driven gear 32, and the output gear 33 in between them. Further, in order to increase contact areas of the base plates 34 with the shafts 31A, 32C, 33A, the shaft holes 34A-34C are formed to protrude outwardly in bosses.

Further, each of the shaft holes 34B is formed to have a grove 34E, in which lubricant to reduce friction between an outer circumferential surface of the shaft 32C and an inner circumferential surface of the shaft hole 34B is filled. More specifically, the lubricant reduces friction in a slidable section 34D (see FIG. 3) between the outer circumferential surface of the shaft 32C and the inner circumferential surface of the shaft hole 34B. The slidable section 34D is an area, in which the shaft 32C of the driven gear 32 being rotated according to the rotation of the driving gear 31 and the shaft hole 34B become slidably in contact with each other.

Figure 3:
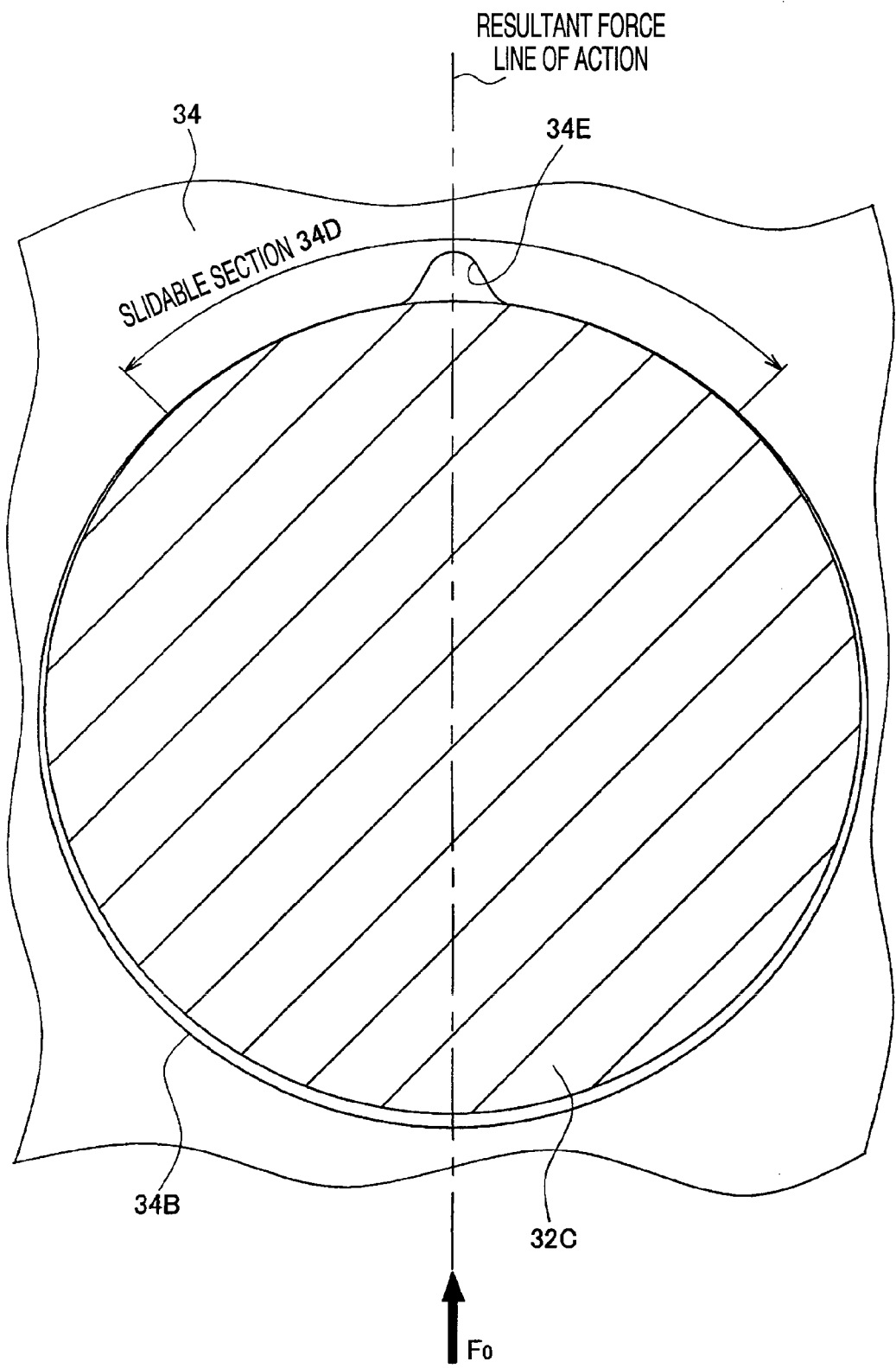
FIG. 3 is an enlarged view of a shaft 32C and a shaft hole 34B of a driven gear 32 in the first gear system 30 according to the first embodiment of the present invention.

In FIG. 3, an area, in which the shaft hole 34B can be geometrically in contact with the shaft 34C, is indicated as the slidable section 34D, and deformation of the shaft 32C or the shaft hole 34B due to contact stress is not taken into consideration. In practice, however, when the driven gear 32 is rotated according to the rotation of the driving gear 31, the shaft 32C and the shaft hole 34B are deformed by the contact stress. Therefore, the slidable section may practically occupy a larger area with respect to the circumference of the shaft 34C and the circumference of the shaft hole 34B than the slidable section 34D as shown in FIG. 3.

The groove 34E is formed in parallel with an axial direction of the shaft hole 34B and extends throughout entire depth (thickness) of the shaft hole 34B. The groove 34E is formed in a position to meet a line of action Fo (see FIG. 2B), which indicates resultant of occlusal force from the driving gear 31 and occlusal force from the output gear 33. Further, the groove 34E is formed to have a cross-sectional shape of a round wedge (e.g., V-shape) so that stress in the groove 34E is distributed by the curvature.

In the present embodiment, the driven gear 32 including the shafts 32C and the base plates 34 including the shaft holes 34B are made of resin. Accordingly, the circumference of the shaft 32C and the circumference of the shaft hole 34B in the slidable section 34D are made of resin. The shafts 32C may be made of, for example, polyoxymethylene (POM) resin, and the shaft holes 34B may be made of, for example, acrylonitrile butadiene styrene (ABS) or polystyrene (PS) resin.

2.2 Second Gear System

The second gear system 40, including a driving gear 41, a driven gear 42, an output gear 43, and a pair of base plates 44 (see FIGS. 4A and 4B), is configured similarly to the first gear system 30 and made of same materials as those of the first gear system 30 but different in a configuration of the driven gear 42, which is swingable about a rotation axis of the driving gear 41.

Further, each of the driving gear 41, the driven gear 42, and the output gear 43 has a bearing structure. More specifically, the driving gear 41, the driven gear 42, and the output gear 43 have integrally-formed shafts 41A, 42C, and 43A respectively, and the base plates 44 are formed to have shaft holes 44A, 44B, and 44C being bearings, in which the shafts 41A, 42C, 43A are slidably supported. Thus, the driving gear 41, the driven gear 32, and the output gear 33 are rotatably supported by the pair of base plates 34 from axial sides.

In the second gear system 40, the shaft holes 44A, 44C are formed to have cross-sections of circles, and the shaft hole 44B are formed to have a cross-section of an elongated and curved shape.

In particular, the shaft hole 44B is formed to be greater in length than a diameter of the shaft 42A and curved in an arc, which is centered about a rotation axis of the driving gear 41. Therefore, the shaft 42A is movable in the shaft hole 44B along the curvature of longitudinal edges.

More specifically, the shaft hole 44B is formed to be greater in width than the diameter of the shaft 42A; however, difference between the sizes of the width of the shaft hole 44B and the diameter of the shaft 42A is not necessarily large but unrecognizably small. Meanwhile, difference between the sizes of the length of the shaft hole 44B and the diameter of the shaft 42A is substantially recognizably large.

The second gear system 40 is provided with a friction spring 45, which is fixed to the base plate 44 in a position opposite from the driving gear 41 across the shaft 42A of the driven gear 42. The friction spring 45 is a conical coil spring, which tends to expand in the position between the base plate 44 and the driven gear 42 and applies resistance force to the driven gear 42 so that rotation of the driven gear 42 is restricted.

When the driving gear 41 is rotated in a predetermined direction (e.g., a counterclockwise direction in FIG. 4A), the driven gear 42 tends to rotate in an opposite direction (e.g., a clockwise direction in FIG. 4A). However, with the resistance force from the friction spring 45, the rotation in the clockwise direction is restricted, and the driven gear 42 swings about a rotation axis (i.e., the shaft 41A) of the driving gear 41 in the counterclockwise direction along with the rotation of the driving gear 41.

When the driven gear 42 swings about the shaft 42A of the driving gear 41, the shaft 42A of the driven gear 42 moves in the shaft hole 44B along the curvature to one of the lengthwise ends (e.g., a lower end in FIG. 4A), in which the driven gear 42 is engaged with the output gear 43.

When the driven gear 42 is at the lower end of the shaft hole 44B, and when the driving gear rotates further in the counterclockwise direction, the driven gear 42 is urged against the lower end of the shaft hole 44B and restricted from being moved further. Accordingly, the driven gear 42 slips against the friction spring 45 and starts rotating about the shaft 42A. Thus, the rotation of the driving gear 41 is transmitted to the output gear 43 via the driven gear 42.

That is, when the driving force from the driving gear 41 is applied to the driven gear 42, due to the occlusal stress (as indicated by a double-dotted arrow in FIG. 4A) caused between the driving gear 41 and the driven gear 42, force in a direction from the upper lengthwise end of the shaft hole toward the lower lengthwise end of the shaft hole (i.e., from upper right toward lower left in FIG. 4A) is applied to the shaft 42A of the driven gear 42.

Whilst the rotating force of the driving gear 41 is applied to the driven gear 42, due to the resultant Fo of the occlusal stress caused by the driving gear 41 and the occlusal stress caused by the output gear 43, a position of the shaft 42A being urged against the lower lengthwise end of the shaft hole 44B is fixed, and the driven gear 42 is maintained rotated at the fixed position.

The second gear system 40 is, similarly to the first gear system 30, provided with a groove 44E (see FIGS. 5A and 5B), in which lubricant to reduce friction at a slidable section 44D is filled, at the lower lengthwise end of each shaft hole 44B. The slidable section 44D is an area, in which the shaft 42C of the driven gear 42 being rotated according to the rotation of the driving gear 41 and the shaft hole 44B become slidably in contact with each other.

The groove 44E in the second gear system 40 is formed in parallel with an axial direction of the shaft hole 44B and extends throughout entire depth (thickness) of the shaft hole 34B. The groove 44E is formed in a position to meet a line of action Fo (see FIG. 4A), which indicates resultant of occlusal force from the driving gear 41 and occlusal force from the output gear 43. Further, the groove 44E is formed to have a cross-sectional shape of a round wedge so that stress in the groove 44E is distributed by the curvature.

According to the present embodiment, the image forming apparatus 1 is provided with a sheet jam sensor (not shown), which monitors a sheet-conveying behavior of the image forming apparatus 1 and detects sheet jam. When the sheet jam is detected by the sheet-jam sensor, signals indicating the sheet jam are inputted in the controller.

Thus, when the signals indicating the sheet jam are inputted, the controller controls the drive source 21 to generate a small amount of reverse rotation. Accordingly, the driving gear 41 is rotated in the reverse direction, and reverse force in an opposite direction from the direction of the occlusal stress (see FIG. 4A) is applied to the driven gear 42.

In this regard, the driven gear 42 is affected by the resistance force from the friction spring 4, and the driven gear 42 is restricted from being rotated. Accordingly, force F (see FIG. 4B) to move the driven gear 42 along a pitch circle of the driving gear 41 in the same direction as the rotation of the driving gear 41 is generated.

Due to the force F, the shaft 42A of the driven gear 42 is moved away from the lower lengthwise end (e.g., the lower left in FIG. 4B) of the shaft hole 44B to the upper lengthwise end (e.g., the upper right in FIG. 4B) of the shaft hole 44B. In this regard, the driven gear 42 is disengaged from the output gear 43. Therefore, the output gear 43 is disconnected and released from the drive source 21. Whilst the output gear 43, which can transmit the driving force to some of the sheet-conveying rollers in the image forming apparatus, is rotatable independently from the drive source 21, the sheet-conveying rollers can be rotated manually, and the jammed sheet may be smoothly removed from the sheet-conveying path.

3. Effects of the Gear Systems

According to the present embodiment, the shaft holes 34B, 44B are formed to have the lubricant-containing grooves 34E, 44E in the slidable sections 34D, 44D, in which the shafts 32C, 42A and the shaft holes 34B, 44B become slidably in contact with each other when the driven gears 32, 42 are rotated by the driving force transmitted via the driving gears 31, 41. Therefore, the lubricant can be supplied to the slidable sections 34D, 44D, in which contact pressure tends to increase. Thus, lubricities between the shaft 32C and the shaft hole 34B and between the shaft 42A and the shaft hole 44B can be improved.

It may be noted that the shaft holes 34B, 44B are openings immovably formed in the base plates 34, 44, and the shafts 32C, 32A are in contact with same portions of the shaft holes 34B, 44B. In other words, the slidable sections 34D, 44D in the shaft holes 34B, 44B are fixed, and the slidable sections 34D, 44D in the shaft holes 34B, 44B may be abraded earlier.

In the present embodiment, therefore, the grooves 34E, 44E are formed in the slidable sections 34D, 44D in the shaft holes 34B, 44B so that the earlier abrasion of the slidable sections 34D, 44D in the shaft holes 34B, 44B can be prevented.

It may be noted that, in the second gear system 40 described above, the shaft hole 44B, which provides the room for the shaft 42A to move therein, is formed to have an elongated shape. In other words, the opening of the shaft hole 44B is larger than the cross-section of the shaft 42A. Therefore, it may be concerned that the larger opening cannot stably hold the lubricant therein, and the lubricant is not steadily supplied to the slidable section 44D, in which the contact pressure tends to increase.

In the present embodiment, however, the groove 44E to reserve the lubricant is formed in the lengthwise end of the shaft hole 44B in the slidable section 44D, in which the shaft 42A of the driven gear 42 being driven by the driving gear 41 is urged and rotated. Accordingly, even with the elongated and larger shape of the shaft hole 44B, the lubricant can be supplied securely to the slidable section 44D, in which contact pressure tends to increase. Further, the groove 44E is formed in a downwardly dented shape (i.e., V-shape) having an open end thereof in the upper position and a bottom thereof in the lower position so that the lubricant can be maintained therein naturally.

[Second Embodiment]

A second embodiment according to the present invention will be described with reference to FIG. 6. In the embodiments described below, including the second embodiment, configurations similar to those in the first embodiment will be referred to by the identical reference signs, and description of those will be omitted. According to the second embodiment, at least one of the first gear system 30 and the second gear system 40 may be configured to have a plurality of grooves 34E, 44E in the slidable sections 34D, 44D.

Figure 6:
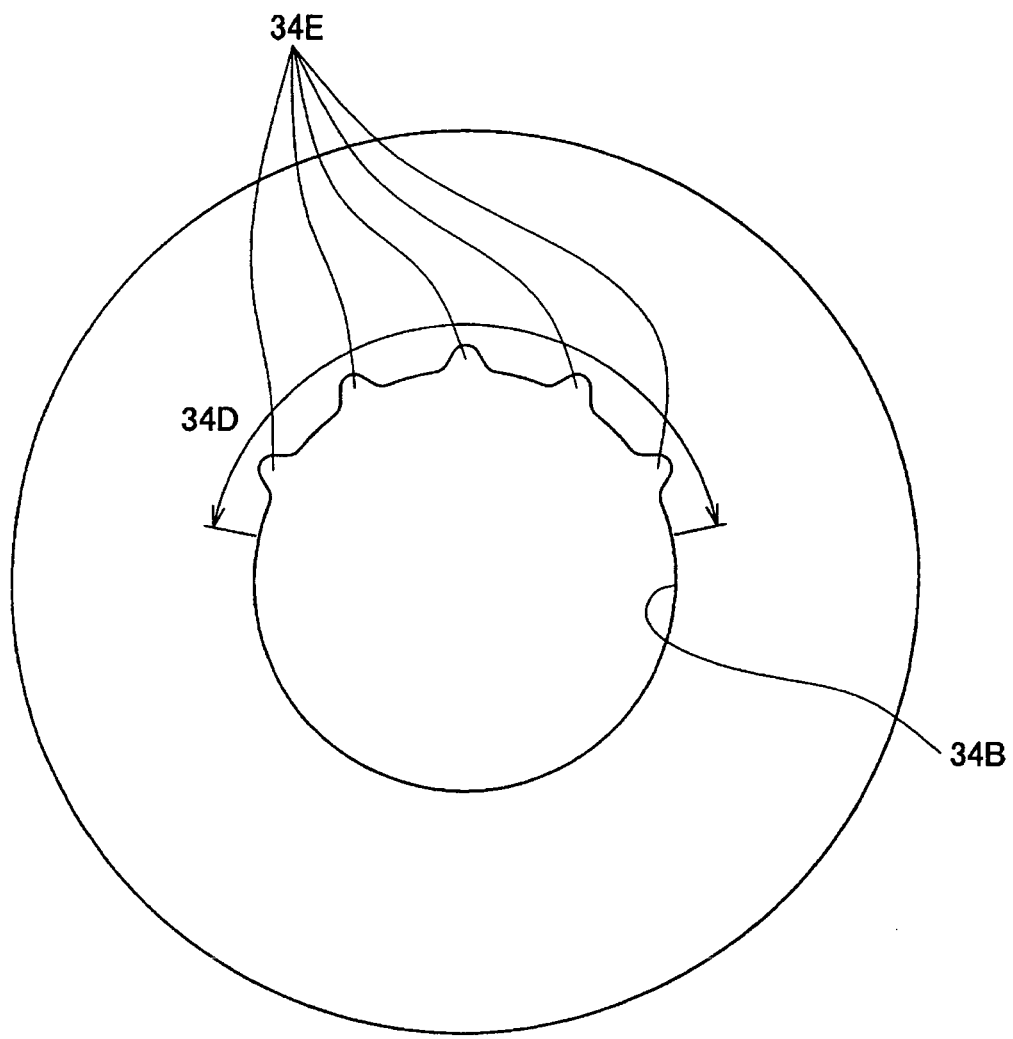
FIG. 6 is an enlarged view of a slidable section 34D in the shaft hole 34B with the grooves 34E according to a second embodiment of the present invention.

As shown in FIG. 6, the plurality of grooves 34E extending in parallel with the axial direction of the shaft hole 34B may be formed throughout the entire depth (thickness) of the shaft hole 34B. Although FIG. 6 shows solely the grooves 34E in the slidable section 34D of the first gear system 30, the second gear system 40 may be similarly configured to have the plurality of grooves 44E in the slidable section 44D of the shaft hole 44B.

[Third Embodiment]

A third embodiment according to the present invention will be described with reference to FIGS. 7A and 7B. In the third embodiment, the base plates 34, 44 in the first and second gear systems 30, 40 are formed to have the shafts 32C, 42A respectively, and the driven gears 32, 42 are formed to have the shaft holes 34B, 44B respectively (solely the first gear system 30 is shown in FIGS. 7A and 7B).

Accordingly, the shafts 32C, 42A in the base plates 34, 44 are formed to have the grooves 34E, 44E. FIGS. 7A and 7B show solely the shaft hole 34B and the shaft 32C including the slidable section 34D, and illustration of the shaft hole 44B and the shaft 42A are omitted. The shaft 32C may have solely one groove 34E on the line of action Fo for the resultant of occlusal force (see FIG. 7A) or a plurality of grooves 34E distributed in the slidable section 34D (see FIG. 7B). Although FIGS. 7A and 7B show solely the shaft hole 34B and the shaft 32C in the first gear system 30, the second gear system 40 may be similarly configured to have the shaft 42A and the shaft hole 44B in the reversed arrangement.

[Fourth Embodiment]

A fourth embodiment according to the present invention will be described with reference to FIGS. 8A-8D. In the fourth embodiment, the base plate 34 in the first gear system 30 is formed to have a plurality of grooves 34E winding in spirals in the shaft hole 34B. More specifically, as shown in FIGS. 8B and 8C, which show cross-sectional views of the shaft hole 34B with the spiral grooves 34E viewed along a viewing direction D1, the grooves 34E are inclined with respect to an axial line L1 of the shaft hole 34E. In the present embodiment, the axial line L1 corresponds to the rotation axis of the shaft 32 and a center of the shaft hole 34B. The viewing direction D1 is a direction perpendicular to the axial line L1 and to face with the axial line L1 to view the grooves 34E in the shaft hole 34B.

Due to the spiral forms of the grooves 34E, the shaft 32C rotating with respect to the shaft hole 34B involves the lubricant in the grooves 34E to be carried along the rotation on the circumferential surface thereof. More specifically, when the shaft 32C rotates, shearing force Fs (see FIG. 8D) in the direction of rotation of the shaft 32C is applied to the lubricant in the grooves 34E being in contact with the shaft 32C. Accordingly, the lubricant being blocked by edges 34W is moved along the grooves 34E in a direction indicated by a broken arrow in FIG. 8D. Thus, the lubricant is efficiently circulated to be supplied to the entire slidable section 34D and prevented from being caught in the grooves 34E. Therefore, lubricities between the shaft 32C and the shaft hole 34B can be improved.

It is to be noted that the configurations of the shaft hole 34B and the grooves 34E are not limited to those shown in FIGS. 8A-8D. For example, the driven gear 32 may be rotated in an opposite direction from the rotating direction shown in FIG. 8A. Additionally or alternatively, the grooves 34E may be inclined in a reversed orientation from the inclination shown in FIGS. 8B-8D. In such configurations, it is desirable that the lubricant in the grooves 34E is moved in a direction opposite from the direction indicated by the broken arrow in FIG. 8D, i.e., in a direction toward the driven gear 32, so that the lubricant is supplied to the entire sliceable section 34D.

It is to be noted that the grooves 34E are formed in spirals, and the grooves 34E can be viewed from any positions in 360 degrees as long as the viewer is in the perpendicular position with respect to the axial line L1. Therefore, the viewing direction D1 can be any direction within the perpendicular position with respect to the axial line L1. In the present embodiment, meanwhile, at least a part of the grooves 34E is in the slidable section 34D and specifically in the position on the line of action for resultant of the occlusal force. Therefore, it is convenient to consider the line of action for resultant of the occlusal force coincides with the viewing direction D1. Hereinafter, therefore, the line of action for resultant of the occlusal force is referred to as the viewing direction D1 unless otherwise noted.

It is to be noted, although FIGS. 8A-8D show solely the shaft holes 34B and the shaft 32C in the first gear system 30, the second gear system 40 may be similarly configured to have the shaft holes 44B with the spiral grooves 44E and the shaft 42A.

[Fifth Embodiment]

A fifth embodiment according to the present invention will be described with reference to FIGS. 9A-9D. In the fourth embodiment (see FIGS. 8A-8D), the base plate 34 in the first gear system 30 is formed to have a plurality of spiral grooves 34E, which are inclined in a constant angle with respect to the axial line L1. In the fifth embodiment, the base plate 34 is formed to have the shaft hole 34B with the grooves 34E, and each of the grooves 34E is formed to have a first section 34F and a second section 34G. The first section 34F is formed to incline in a first angle θ1, and the second section 34G is formed to incline in a second angle θ2, which is different from the first angle θ1 (see FIG. 8D).

According to the present embodiment, the first angle θ1 is greater than or equal to 90 degrees, and the second angle θ2 is smaller than 90 degrees. Therefore, the groove 34E having the first section 34F and the second section 34G, when viewed along the viewing direction D1, has a shape of 90-degrees rotated V. More specifically, the first section 34F and the second section 34G are closer to each other at front parts with respect to the direction of rotation (as indicated by thick arrows Fs1, Fs2) of the driven gear 32 and further from each other at rear parts with respect to the direction of rotation of the driven gear 32. The thick arrows Fs1, Fs2 indicate shearing forces caused by the rotation of the shaft 32C.

In other words, the first section 34F and the second section 34Ga are formed to extend from axial ends (i.e., the upper edge and the lower edge in FIG. 9D) of the shaft hole 34B and inclined with respect to the axial line L1 toward a center of the depth (i.e., axial length) of the shaft hole 34B.

Due to the angled orientation of the grooves 34E, the shaft 32C rotating with respect to the shaft hole 34B involves the lubricant in the grooves 34E to be carried along the rotation on the circumferential surface thereof. More specifically, when the shaft 32C rotates, shearing forces Fs1, Fs2 in the direction of rotation of the shaft 32C is applied to the lubricant in the grooves 34E being in contact with the shaft 32C. Accordingly, as indicated by broken arrows in FIG. 9D, the lubricant in the first section 34F is moved toward the second section 34G, and the lubricant in the second section 34G is moved toward the first section 34F. Thus, the lubricant is efficiently supplied to the slidable section 34D whilst surplus lubricant is collected in the depth-center of the shaft hole 34B. Accordingly, the lubricant in the axial end areas in the groove 34E is prevented from leaking out of the bearing, which includes the shaft hole 34B and the shaft 32C.

Although FIGS. 9A-9D show solely the shaft holes 34B and the shaft 32C in the first gear system 30, the second gear system 40 may be similarly configured to have the shaft holes 44B with the angled grooves 44E and the shaft 42A.

[Sixth Embodiment]

A sixth embodiment according to the present invention will be described with reference to FIG. 10. In the fourth embodiment, the base plate 34 in the first gear system 30 is formed to have the plurality of grooves 34E winding in spirals in the shaft hole 34B, and the driven gear 32 is provided with the shaft 32C. In the present embodiment, on the other hand, the base plate 34 is provided with the shaft 32C, and the driven gear 32 is formed to have the shaft hole 34B. Further, the shaft 32C provided to the base plate 34 is formed to have a plurality of spiral grooves 34E, and at least a part of the grooves 34E is in the slidable section 34D.

According to the above configuration, the lubricant is efficiently circulated to be supplied to the entire slidable section 34D. Although FIG. 10 shows solely the shaft hole 34B and the shaft 32C in the first gear system 30, the second gear system 40 may be similarly configured to have the shaft holes 44B and the shaft 42A in the reversed arrangement.

[Seventh Embodiment]

A seventh embodiment according to the present invention will be described with reference to FIG. 11. In the fourth embodiment, the base plate 34 in the first gear system 30 is formed to have the plurality of grooves 34E winding in spirals in the shaft hole 34B, and the driven gear 32 is provided with the shaft 32C. In the present embodiment, on the other hand, the base plate 34 is provided with the shaft 32C, and the driven gear 32 is formed to have the shaft hole 34B. Further, the shaft 32C provided to the base plate 34 is formed to have a plurality of grooves 34E, and at least a part of the grooves 34E is in the slidable section 34D. Furthermore, each of the grooves 34E is formed to have an angled first section 34F and an angled second section 34G.

Thus, the lubricant is efficiently supplied to the slidable section 34D whilst surplus lubricant is collected in the lengthwise center of the shaft 32C. Accordingly, the lubricant in the axial end areas of the shaft 32C in the groove 34E is prevented from leaking out of the bearing structure, which includes the shaft 32C and the shaft hole 34B.

Although FIG. 11 shows solely the shaft hole 34B and the shaft 32C in the first gear system 30, the second gear system 40 may be similarly configured to have the shaft 42A with the angled grooves 44E and the shaft holes 44B.

[Eighth Embodiment]

An eighth embodiment according to the present invention will be described with reference to FIGS. 12A, 12B, 13A, and 13B. In the seventh embodiment, the base plate 34 in the first gear system 30 is formed to have the shaft 32C with the plurality of angled grooves. In the present embodiment, on the other hand, the driven gear 32 is formed to have the grooves 34E. The grooves 34E may be formed in spirals or in the 90-degrees rotated V-shapes, when viewed along the viewing direction D1. In this regard, the driven gear 32 may or may not be provided with the shaft 32C.

FIG. 12A shows the driven gear 32 with the shaft 32C and the base plate 34 with the shaft hole 34B. The shaft 32C in the driven gear 32 is formed to have the spiral grooves 34E.

FIG. 12B shows the driven gear 32 with the shaft 32C and the base plate 34 with the shaft hole 34B. The shaft 32C in the driven gear 32 is formed to have the angled grooves 34E.

FIG. 13A shows the driven gear 32 with the shaft hole 34B and the base plate 34 with the shaft 32. The shaft hole 34B in the driven gear 32 is formed to have the spiral grooves 34E on the inner circumference thereof. FIG. 13A shows the driven gear 32 with the shaft hole 34B and the base plate 34 with the shaft 32. The shaft hole 34B in the driven gear 32 is formed to have the angled grooves 34E on the inner circumference thereof.

Due to the spiral or the angled shapes of the grooves 34E, the shaft 32C rotating with respect to the shaft hole 34B involves the lubricant in the grooves 34E to be carried along the rotation on the circumferential surface thereof. Thus, the lubricant is efficiently circulated to be supplied to the entire slidable section 34D and prevented from being caught in the grooves 34E. Therefore, lubricities between the shaft 32C and the shaft hole 34B can be improved.

Although FIGS. 12A, 12B, 13A, and 13B show solely the shaft holes 34B and the shaft 32C in the first gear system 30, the second gear system 40 may be similarly configured to have the grooves 44E in the driven gear 44.

[Ninth Embodiment]

A ninth embodiment according to the present invention will be described with reference to FIGS. 14A and 14B. In the above embodiments, the driven gear 32 in the first gear system 30 transmits the driving force to the rollers via the output gear 33. In the ninth embodiment, the shaft 32C of the driven gear 32 serves as a driving shaft for the rollers.

In the ninth embodiment, the groove 34E is formed in a slidable section in the shaft hole 34B in the base plate 34, in which the shaft 32C and the shaft hole 34B become slidably in contact with each other when the driven gear 32 is rotated by the rotation of the driving gear 31. According to the configuration of the ninth embodiment, several components including the output gear 33 in the first gear system 30 can be omitted, and manufacturing cost may be reduced.

[More Examples]

Although examples of carrying out the invention have been described, those skilled in the art will appreciate that there are numerous variations and permutations of the gear systems and the image forming apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the above-described gear systems may not necessarily be employed in the electrophotofraphic image forming apparatus but may be employed in an auto document feeder and an inkjet image forming apparatus, in which the gear systems may serve to transmit driving force to conveyer rollers.

For another example, the gears in the gear systems may not necessarily be spur gears but may be helical gears or gears in other shapes. If helical gears are employed, the gears may be affected by thrust loading; therefore, the shaft holes to receive the gears may not necessarily be perforated openings but may be thrust bearings, which are open at one end and closed at the other end.

In the above embodiments, the configuration to hold the driven gears 32, 42, including the outer surfaces of the shafts 32C, 42C and the inner circumferences of the shaft holes 34B, 44B in the slidable sections 34D, 44D, are made of resin. However, materials to hold the driven gears 32, 42 are not limited to resin. For example, one of the outer surfaces of the shafts 32C, 42C and the inner circumferences of the shaft holes 34B, 44B may be made of resin or metal.

What is claimed is:

1. A gear system, comprising:
a first driven gear configured to rotate by a driving force from and engage with a driving gear;
a second driven gear configured to be rotated by the driving force from the driving gear, through engagement with the first driven gear;
a base member configured to support the first driven gear; and
a bearing structure by which the first driven gear is rotatably attached to the base member, the bearing structure including:
 a shaft;
 a sidewall defining an elongated shaft hole configured to rotatably support the shaft, the shaft hole being elongated in an extending direction perpendicular to a rotational axis of the shaft, the shaft hole having a first end and a second end in the extending direction, wherein, when the shaft is disposed at the first end of the elongated shaft hole, the driving gear and the second driven gear are engaged with the first driven gear and, via engagement with the first driven gear, bias the shaft to a plurality of slidable contact positions along a portion of the sidewall defining the first end of the elongated shaft hole, the plurality of slidable contact positions defining a slidable section; and
 a lubricant reservoir disposed in the slidable section and storing lubricant,
wherein the first driven gear is configured to be moved between the first and second ends of the elongated shaft hole based on a rotation direction of the driving gear,
wherein, when the shaft is moved toward the second end of the elongated shaft hole, the first driven gear is disengaged from the second driven gear,
wherein one of the shaft and the shaft hole is provided to the first driven gear, and the other of the shaft and the shaft hole is provided to the base member, and
wherein the lubricant reservoir is formed in one of the shaft and the shaft hole provided to the base member.

2. The gear system according to claim 1,
wherein the shaft hole is formed in the base member, and the shaft is provided to the first driven gear, and
wherein the elongated shaft hole has longitudinal edges which are greater than a diameter of the shaft.

3. The gear system according to claim 2,
wherein the lubricant reservoir is formed on a line of action defined by a resultant force from the engagement of the first driven gear with the second driven gear and the driving gear, the resultant force including an occlusal force from the driving gear and an occlusal force from the second driven gear.

4. The gear system according to claim 1,
wherein the lubricant reservoir is formed in an inclined orientation with respect to an axial line of at least one of the shaft and the shaft hole when the lubricant reservoir is viewed along a viewing direction, the viewing direction being perpendicular to the axial line of the at least one of the shaft and the shaft hole and to face with the axial line.

5. The gear system according to claim 4,
wherein the lubricant reservoir includes a first section, which is formed to incline with respect to the axial line at a first angle when viewed along the viewing direction, and a second section, which is formed to incline with respect to the axial line at a second angle different from the first angle when viewed along the viewing direction.

6. The gear system according to claim 5,
wherein the first section and the second section in the lubricant reservoir are formed to extend from axial ends of the shaft hole and incline with respect to the axial line, when viewed along the viewing direction, toward a center of axial length of the shaft hole to be closer to each other at front parts and further from each other at rear parts with respect to a direction of rotation of the first driven gear.

7. The gear system according to claim 1,
wherein at least one of an outer surface of the shaft and an inner circumference of the shaft hole in the slidable section is made of resin.

8. The gear system according to claim 1,
wherein at least one of an outer surface of the shaft and an inner circumference of the shaft hole in the slidable section is made of metal.

9. The gear system according to claim 1,
wherein the shaft hole is formed in the first driven gear, and the shaft is provided to the base member.

10. The gear system according to claim 1,
wherein the lubricant reservoir is at least one groove.

11. An image forming apparatus, comprising:
an image forming unit configured to form an image on a sheet;
rollers configured to move the sheet in the image forming apparatus; and
a gear system configured to transmit a driving force to the rollers,
wherein the gear system includes:
  a first driven gear configured to rotate by the driving force transmitted from a driving gear;
  a second driven gear configured to be rotated by the driving force from the driving gear through engagement with the first driven gear;
  a base member configured to support the first driven gear; and
  a bearing structure by which the first driven gear is rotatably attached to the base member, the bearing structure comprising:
    a shaft;
    a sidewall defining an elongated shaft hole configured to rotatably support the shaft, the shaft hole being elongated in an extending direction perpendicular to a rotational axis of the shaft, the shaft hole having a first end and a second end in the extending direction, wherein, when the shaft is disposed at the first end of the elongated shaft hole, the driving gear and the second driven gear are engaged with the first driven gear and, via engagement with the first driven gear, bias the shaft to a plurality of slidable contact positions along a portion of the sidewall defining the first end of the elongated shaft hole, the plurality of slidable contact positions defining a slidable section; and
    a lubricant reservoir disposed in the slidable section and storing lubricant,
wherein the first driven gear is configured to be moved between the first and second ends of the elongated shaft hole based on a rotation direction of the driving gear,
wherein, when the shaft is moved toward the second end of the elongated shaft hole, the first driven gear is disengaged from the second driven gear,
wherein one of the shaft and the shaft hole is provided to the first driven gear, and the other of the shaft and the shaft hole is provided to the base member, and
wherein the lubricant reservoir is formed in one of the shaft and the shaft hole provided to the base member.

12. A gear system, comprising:
a first driven gear configured to rotate by a driving force from and engage with a driving gear;
a second driven gear configured to be rotated by the driving force from the driving gear, through engagement with the first driven gear;
a base member configured to support the first driven gear; and
a bearing structure by which the first driven gear is rotatably attached to the base member, the bearing structure including:
  a shaft;
  a sidewall defining a shaft hole configured to rotatably support the shaft, wherein the driving gear and second driven gear, by engagement with the first driven gear, bias the shaft to only a plurality of slidable contact positions along a portion of the sidewall defining the shaft hole, the plurality of slidable contact positions defining a slidable section, the slidable section being less than an entire circumference of the shaft hole; and
  a lubricant reservoir disposed within the slidable section and storing lubricant,
wherein one of the shaft and the shaft hole is provided to the first driven gear, and the other of the shaft and the shaft hole is provided to the base member, and
wherein the lubricant reservoir is formed in one of the shaft and the shaft hole provided to the base member.

* * * * *